(12) United States Patent
Hasegawa

(10) Patent No.: US 11,914,740 B2
(45) Date of Patent: Feb. 27, 2024

(54) DATA GENERALIZATION APPARATUS, DATA GENERALIZATION METHOD, AND PROGRAM

(71) Applicant: NIPPON TELEGRAPH AND TELEPHONE CORPORATION, Tokyo (JP)

(72) Inventor: Satoshi Hasegawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 367 days.

(21) Appl. No.: 17/434,761

(22) PCT Filed: Feb. 20, 2020

(86) PCT No.: PCT/JP2020/006711
§ 371 (c)(1),
(2) Date: Aug. 30, 2021

(87) PCT Pub. No.: WO2020/184127
PCT Pub. Date: Sep. 17, 2020

(65) Prior Publication Data
US 2022/0171872 A1 Jun. 2, 2022

(30) Foreign Application Priority Data
Mar. 11, 2019 (JP) ................... 2019-043664

(51) Int. Cl.
*G06F 21/62* (2013.01)
(52) U.S. Cl.
CPC ............... *G06F 21/6227* (2013.01)

(58) Field of Classification Search
CPC .................................................. G06F 21/6227
(Continued)

(56) References Cited

U.S. PATENT DOCUMENTS 8,566,607 B2 * 10/2013 Flynn .................. G06F 12/1408
711/138
10,977,446 B1 * 4/2021 Anaya ..................... G06F 40/30
(Continued)

OTHER PUBLICATIONS

Nishikawa et al., "Design and Preliminary Evaluation of Interactive Anonymization of Large Scale Data using Out-of-order Database Engine", The Institute of Electronics, Information and Communication Engineers, IEICE Technical Report DE2018-28, Dec. 2018, pp. 61-64 (8 pages including English Translation).

*Primary Examiner* — Thanh T Le
(74) *Attorney, Agent, or Firm* — XSENSUS LLP

(57) ABSTRACT

A data generalization apparatus that can perform generalization processing on large-scale data at high speed using only a primary storage device of a small capacity. Included is a rearrangement unit that rearranges the attribute values in a secondary storage device in accordance with an order of arrangement of the attribute values in a generalization hierarchy in the secondary storage device, an attribute value retrieval unit that retrieves some of the rearranged attribute values from the secondary storage device into a primary storage device, and a generalization hierarchy retrieval unit that retrieves a portion of the generalization hierarchy from the secondary storage device into the primary storage device. Further, there is a generalization processing unit that executes generalization processing based on the attribute values retrieved into the primary storage device and the generalization hierarchy retrieved into the primary storage device, and a re-rearrangement unit.

6 Claims, 5 Drawing Sheets

(58) Field of Classification Search
USPC .......................................................... 726/27
See application file for complete search history.

(56) References Cited

U.S. PATENT DOCUMENTS

2017/0169252 A1* 6/2017 Ukena-Bonfig .... G06F 21/6254
2018/0150243 A1* 5/2018 Beard ..................... G06F 3/065

* cited by examiner

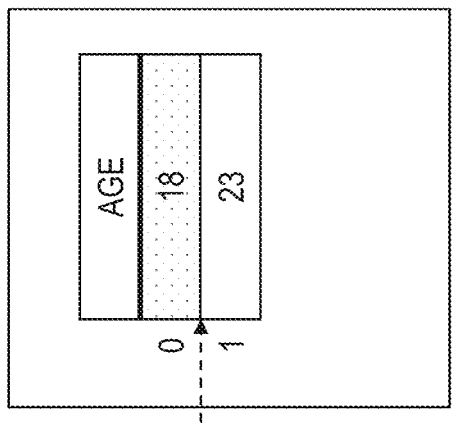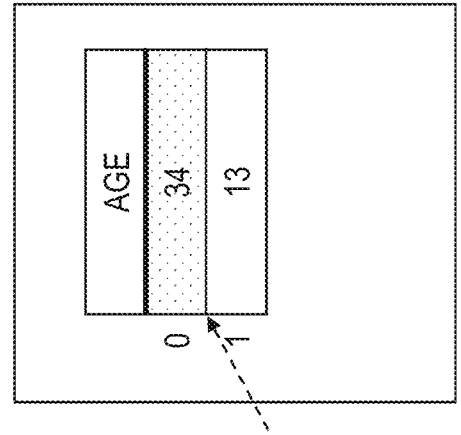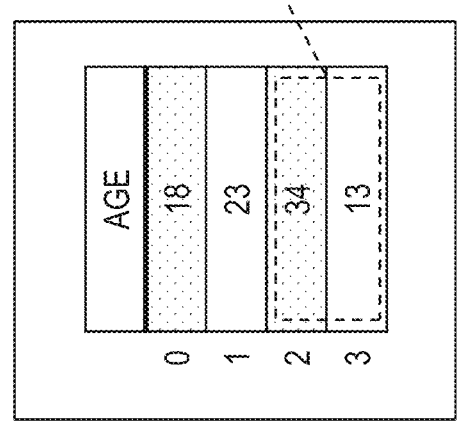
FIG.2

DATA GENERALIZATION APPARATUS, DATA GENERALIZATION METHOD, AND PROGRAM

CROSS-REFERENCE TO RELATED APPLICATIONS

The present application is based on PCT filing PCT/JP2020/006711, filed Feb. 20, 2020, which claims priority to JP 2019-043664, filed Mar. 11, 2019, the entire contents of each are incorporated herein by reference.

TECHNICAL FIELD

The present invention relates to techniques for concealing individual data in a database, and to a data generalization apparatus, a data generalization method, and a program.

BACKGROUND ART

Techniques for concealing individual data of a database in a deterministic manner are known. For example, concealing processing of a database can be done by applying generalization processing to individual values in the database. Generalization processing means generalization of a value. As shown in the example of FIG. 1, for example, generalization of the gender [male] results in [person] and generalization of the age "13" results in [11-20]. Many of generalization processing techniques prepare a tree structure representing generalized and specialized relationships between values, called a generalization hierarchy, and rewrite values by following a path of the tree structure (raising hierarchy level). For example, in the hierarchy of age in the drawing, raising the hierarchy level for the figure of "13" by one tier results in [11-20] and raising it by two tiers results in [11-40]. The number of tiers by which the hierarchy level is thus raised in generalization will be called the number of tiers raised.

PRIOR ART LITERATURE

Non-Patent Literature

Non-patent Literature 1: Norifumi Nishikawa, Yuuya Isoda, Hideomi Idei, Kazuhiko Mogi, Masayuki Yoshino, Akira Shimizu, Yuto Hayamizu, Kazuo Goda, and Masaru Kitsuregawa, "Design and Preliminary Evaluation of Interactive Anonymization of Large Scale Data using Out-of-order Database Engine", Technical Committee on Data Engineering, p. 377, the Institute of Electronics, Information and Communication Engineers, 2018

SUMMARY OF THE INVENTION

Problems to be Solved by the Invention

There are broadly two approaches to implementing generalization. One is an approach that implements generalization by placing a target database and a generalization hierarchy in a primary storage device. The other is an approach that implements generalization by placing a target database and a generalization hierarchy in a secondary storage device and placing a small amount of data in the primary storage device as needed.

The former is capable of execution at high speed but cannot perform generalization processing on a large-scale database because a capacity of the primary storage device becomes insufficient. The latter includes an approach that places a database in the secondary storage device using a relational database management system (RDBMS) and the like, among others, and implements generalization processing with SQL operations (Non-patent Literature 1). However, SQL operations dedicated to generalization processing have not been prepared, so that some arrangement is necessary for implementing generalization processing in SQL and operations are not efficient (slow) because of not being dedicated operations.

Accordingly, an object of the present invention is to provide a data generalization apparatus that can perform generalization processing on large-scale data at high speed using only a primary storage device of a small capacity.

Means to Solve the Problems

A data generalization apparatus of the present invention is a data generalization apparatus for generalizing attribute values, and includes a rearrangement unit, an attribute value retrieval unit, a generalization hierarchy retrieval unit, a generalization processing unit, and a re-rearrangement unit.

The rearrangement unit rearranges the attribute values in a secondary storage device in accordance with an order of arrangement of the attribute values in a generalization hierarchy in the secondary storage device. The attribute value retrieval unit retrieves some of the rearranged attribute values from the secondary storage device into a primary storage device. The generalization hierarchy retrieval unit retrieves a portion of the generalization hierarchy from the secondary storage device into the primary storage device, the portion corresponding to the attribute values to be processed among the attribute values retrieved into the primary storage device. The generalization processing unit executes generalization processing based on the attribute values retrieved into the primary storage device and the generalization hierarchy retrieved into the primary storage device. The re-rearrangement unit moves the attribute values after the generalization processing to the secondary storage device and rearranges them into an original order.

Effects of the Invention

The data generalization apparatus of the present invention can perform generalization processing on large-scale data at high speed using only a primary storage device of a small capacity.

BRIEF DESCRIPTION OF THE DRAWINGS

FIG. 2 illustrates lookahead processing.

DETAILED DESCRIPTION OF THE EMBODIMENTS

Figure 1:
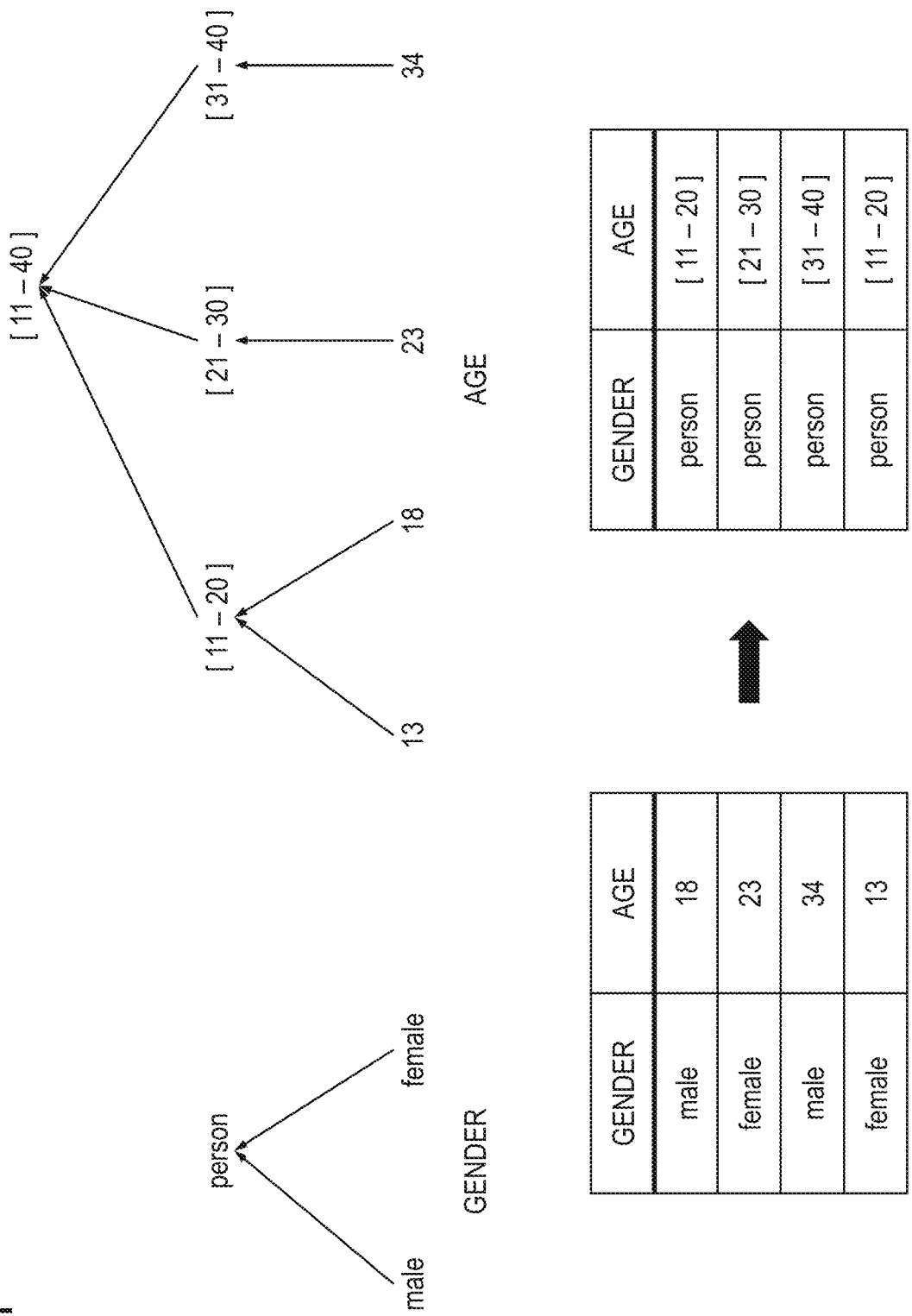
FIG. 1 illustrates generalization processing.

An embodiment of the present invention is described in detail below. Components with the same function are given the same reference numerals and overlapping descriptions are omitted.

<Overview of Processing>

The following embodiment discloses a data generalization apparatus, a data generalization method, and a program that can perform generalization processing on large-scale data at high speed with a primary storage device of a small capacity. A data generalization apparatus, a data generalization method, and a program in a first embodiment enable high-speed processing by designing algorithms and data structure in consideration of a feature that sequential access (successive accesses) to a secondary storage device (for example, an HDD) is faster than random access, a feature that the secondary storage device (for example, an HDD) is slower than a primary storage device (for example, memory), and a feature that the secondary storage device (for example, an HDD) has a larger storage capacity than the primary storage device (for example, memory).

In the embodiment described below, generalization processing performs processing for each attribute in a database. The following description assumes a database with a single attribute for the convenience of description. When generalization processing should be performed on multiple attributes, generalization processing per attribute may be performed on each individual attribute.

[Procedural Step 1]

A target attribute from a database to be generalized is placed in the secondary storage device. Similarly, a generalization hierarchy is also placed in the secondary storage device. Values of the attribute are placed in the secondary storage device so that the values are consecutive. Here, to "place . . . are consecutive" means to place data consecutively so that no other data is interposed in it. When individual values of the attribute are referenced, lookahead processing is performed in reading of data from the secondary storage device to the primary storage device assuming that the values will be sequentially accessed.

Specifically, as shown in the example of lookahead processing in FIG. 2, imagine a case where attribute values of age=18, 23, 34, 13 are stored in the secondary storage device and they are read into the primary storage device in sequence. For the example of the drawing, it is assumed that the primary storage device is able to hold up to two elements. First, as shown in FIG. 2A, when the value of the 0th index is accessed, the values of the 0th and the first indices are transferred to the primary storage device and the value of the 0th index in the primary storage device is retrieved. Next, when the value of the first index is accessed, its data is read from the primary storage device. When the value of the second index is subsequently accessed, the corresponding data is not present in the primary storage device, so the values of the second and third indices are transferred from the secondary storage device to the primary storage device and the value of the 0th index in the primary storage device (corresponding to the second in the secondary storage device) is read out, as shown in FIG. 2B. In this manner, assuming successive accesses, lookahead processing is executed when data is read from the secondary storage device.

When portions of the generalization hierarchy corresponding to certain values (for example, for the value of 13 in the generalization hierarchy of FIG. 1, a tree structure used for processing to retrieve 13→[11-20]→[11-40]) are read from the secondary storage device, the generalization hierarchy is preferably updated based on a least recently used (LRU) algorithm.

[Procedural Step 2]

The target attribute is rearranged by external sort.

[Procedural Step 3]

The respective attribute values of the target attribute are sequentially referenced, a corresponding portion of the generalization hierarchy is retrieved for each value, and generalization processing is performed.

[Procedural Step 4]

The attribute values after being subjected to generalization processing are put back into the original order.

As a result of the previous sorting in [Procedural step 2], the same values appear in a consecutive manner. For the same value, the same portion of generalization hierarchy can be utilized and ones that have been used recently are placed in the primary storage device by the LRU algorithm. Thus, the number of accesses to the secondary storage device can be reduced and generalization processing can be performed efficiently.

In the following, an attribute will be denoted as a vector with "^" placed after the letter, like "a^". This representation is due to reasons related to word processing software; a representation "a^", for example, means a bold letter with a circumflex on it:

$\hat{a}$

The i-th element of a vector will be denoted as $a_i$. In addition, the number of elements in a vector a^will be denoted as |a^|. A generalization hierarchy is denoted by an uppercase letter with "^" placed after the letter (for example, X^). This representation is due to reasons related to word processing software; a representation "X^" means a bold letter with a circumflex on it:

$\hat{X}$

A value corresponding to the value $a_i$ of a certain attribute with the number of tiers raised j in the generalization hierarchy will be denoted as:

$X_{(ej)}^{(j)}$

For example, in FIG. 1, if the generalization hierarchy of AGE is represented as X^ and an attribute value of 13 is generalized with the number of tiers raised of 2, it gives:

$$X_{(13)}^{(2)} = [11 - 40].$$

First Embodiment

Figure 3:
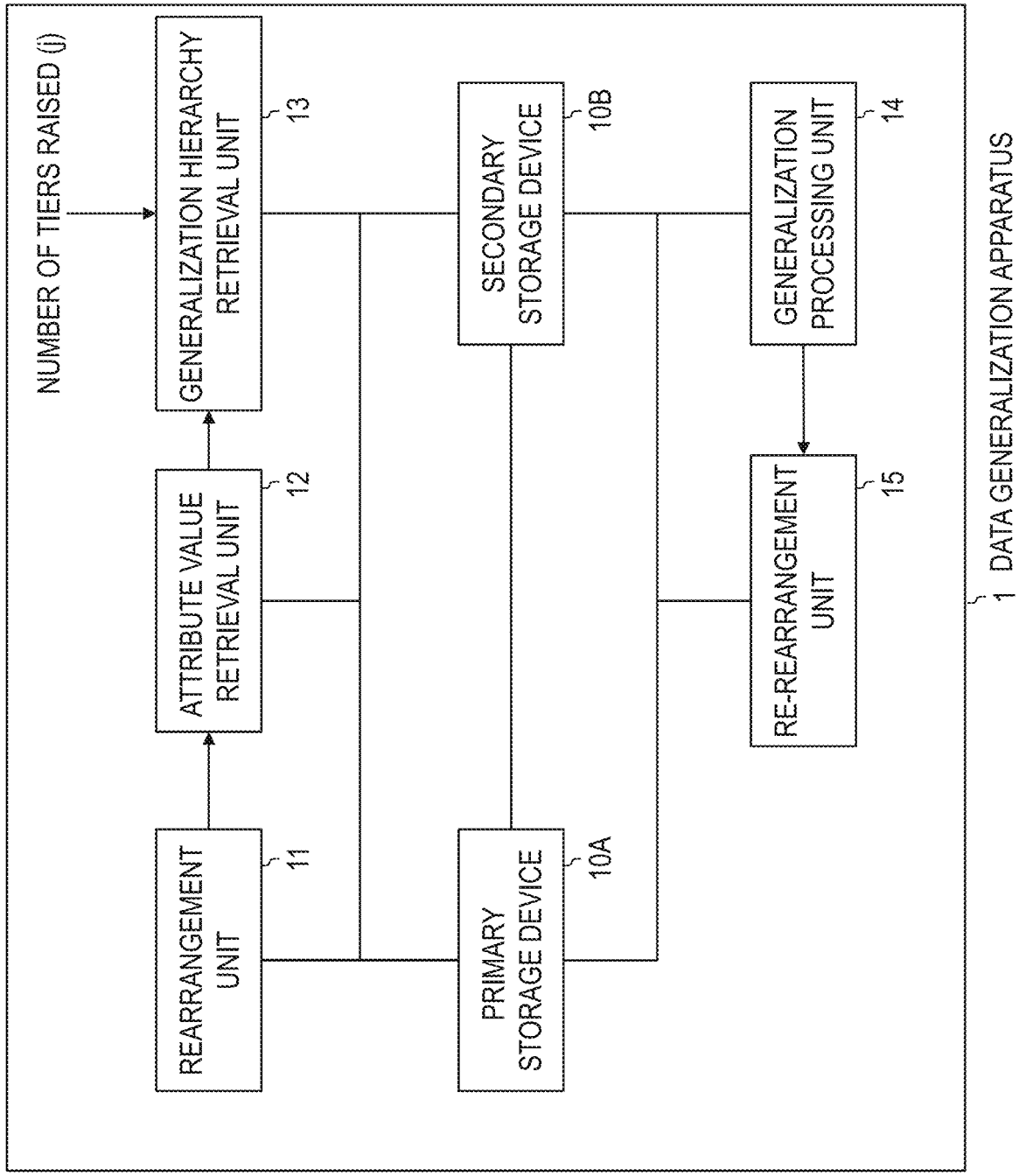
FIG. 3 is a block diagram showing a configuration of a data generalization apparatus in a first embodiment.
Figure 4:
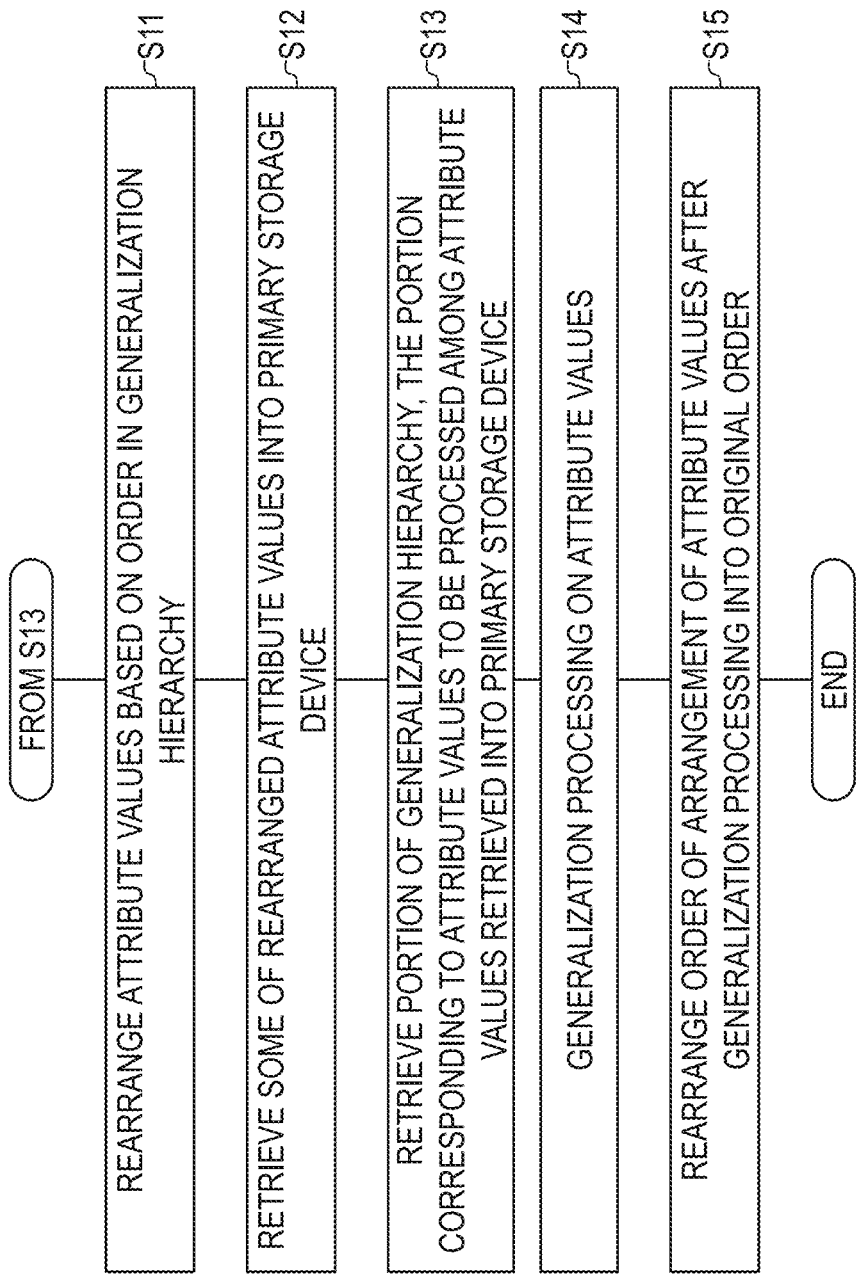
FIG. 4 is a flowchart illustrating operation of the data generalization apparatus in the first embodiment.

In the following, a configuration of the data generalization apparatus in the first embodiment is described with reference to FIG. 3. As shown in the drawing, a data generalization apparatus 1 in this embodiment includes a primary storage device 10A, a secondary storage device 10B, a rearrangement unit 11, an attribute value retrieval unit 12, a generalization hierarchy retrieval unit 13, a generalization processing unit 14, and a re-rearrangement unit 15. Referring to FIG. 4, operation of each component is described below.

<Rearrangement Unit 11>

The rearrangement unit 11 rearranges attribute values in the secondary storage device 10B in accordance with the order of arrangement of the attribute values in the generalization hierarchy at the secondary storage device 10B (S11). The "order of arrangement of the attribute values in the generalization hierarchy" means the order of arrangement of leaves at ends of the tree structure representing the generalization hierarchy, for example. In the example of FIG. 1, the leaves at the ends of the tree structure are arranged in the order of 13, 18, 23, 34, . . . .

<Attribute Value Retrieval Unit 12>

The attribute value retrieval unit 12 retrieves some of the rearranged attribute values from the secondary storage device 10B into the primary storage device 10A (S12). In this embodiment, the attribute value retrieval unit 12 stores some of the rearranged attribute values into a vector $\hat{c}$ (discussed later) prepared in the primary storage device 10A.

<Generalization Hierarchy Retrieval Unit 13>

The generalization hierarchy retrieval unit 13 retrieves a portion of the generalization hierarchy from the secondary storage device 10B into the primary storage device 10A, the portion corresponding to attribute values to be processed among the attribute values retrieved into the primary storage device 10A (S13). Note that the generalization hierarchy retrieval unit 13 retrieves not the whole of the generalization hierarchy but a portion of the generalization hierarchy that corresponds to the attribute values to be processed from the secondary storage device 10B into the primary storage device 10A.

In this embodiment, the generalization hierarchy retrieval unit 13 stores a portion of the generalization hierarchy into a vector $\hat{d}$ (discussed later) prepared in the primary storage device 10A. The generalization hierarchy retrieval unit 13 preferably updates the generalization hierarchy in the primary storage device 10A based on the LRU algorithm.

<Generalization Processing Unit 14>

The generalization processing unit 14 executes generalization processing based on the attribute values retrieved into the primary storage device 10A and the generalization hierarchy retrieved into the primary storage device 10A (S14).

<Re-Rearrangement Unit 15>

The re-rearrangement unit 15 moves the attribute values after generalization processing to the secondary storage device 10B and rearranges them into the original order (S15).

<<Algorithm 1: Large-Scale Data Generalization Algorithm>>

Input: the number of records N, a target attribute $\hat{a}$ to be generalized, the generalization hierarchy $\hat{X}$ corresponding to the attribute, the number of tiers raised j, the number of elements M to be used on the primary storage device 10A

---

Output: a generalized attribute $\hat{b}$
[1]: place the target attribute $\hat{a}$ in the secondary storage device 10B so that its values are consecutive. Here, to "place ... so that its values are consecutive" means to place data consecutively so that no other data is interposed in it. The generalization hierarchy $\hat{X}$ is placed in the secondary storage device 10B. The vectors $\hat{c}$, $\hat{d}$ with the number of elements M are prepared in the primary storage device 10A. $\hat{c}$ is a vector in the primary storage device 10A for the attribute and $\hat{d}$ is a vector in the primary storage device 10A for the generalization hierarchy.
[2]: rearrange the target attribute $\hat{a}$ by external sort. The external sort can be merge-sort, for example (corresponding to S11 in Fig. 4).
[3]: for i = 1 to N do
[4]: retrieve the value $a_i$ of the i-th attribute by Algorithm 2 (corresponding to S12 in Fig. 4).
[5]: retrieve the value in the generalization hierarchy corresponding to $a_i$: $X_{(a_i)}^{(j)}$ by Algorithm 3 (corresponding to S13 in Fig. 4).
[6]: set it as the value of the i-th attribute:
$b_i = X_{(a_i)}^{(j)}$
(corresponding to S14 in Fig. 4).
[7]: end for
[8]: put the generalized attribute bA into the original arrangement of $\hat{a}$ (corresponding to S15 in Fig. 4).
[9]: return $\hat{b}$

---

<<Algorithm 2: Retrieval of Values by Lookahead Algorithm>>

Input: the attribute $\hat{a}$ placed in the secondary storage device 10B, a position i of an element that should be referenced, the vector $\hat{c}$ in the primary storage device 10A Output: value $a_i$
[1]: if the i-th element is not present in $\hat{c}$ then
[2]: retrieve the i-th to the i+|$\hat{c}$|-1-th elements from the secondary storage device 10B and store them in $\hat{c}$.
[3]: end if
[4]: return $a_i$ in $\hat{c}$

---

<<Algorithm 3: Retrieval of Values by LRU Algorithm>>

Input: the generalization hierarchy $\hat{X}$ placed in the secondary storage device 10B, the value $a_i$, of the attribute and the number of tiers raised j representing the position in the generalization hierarchy which should be referenced, the vector $\hat{d}$ in the primary storage device 10A Output:
$X_{(a_i)}^{(j)}$
[1]: if $a_i$ is not present in $\hat{d}$ then
[2]: if $\hat{d}$ is full then
[3]: interchange the least frequently used element in $\hat{d}$ and $(a_i, X_{(a_i)}^{(j)})$
[4]: else
[5]: add, to $\hat{d}$, $a_i$ and its corresponding value in the generalization hierarchy:
$X_{(a_i)}^{(j)}$
together as
$(a_i, X_{(a_i)}^{(j)})$
[6]: end if
[7]: end if
[8]: return
$X_{(a_i)}^{(j)}$
of
$(a_i, X_{(a_i)}^{(j)})$
in $\hat{d}$.

---

Figure 5:
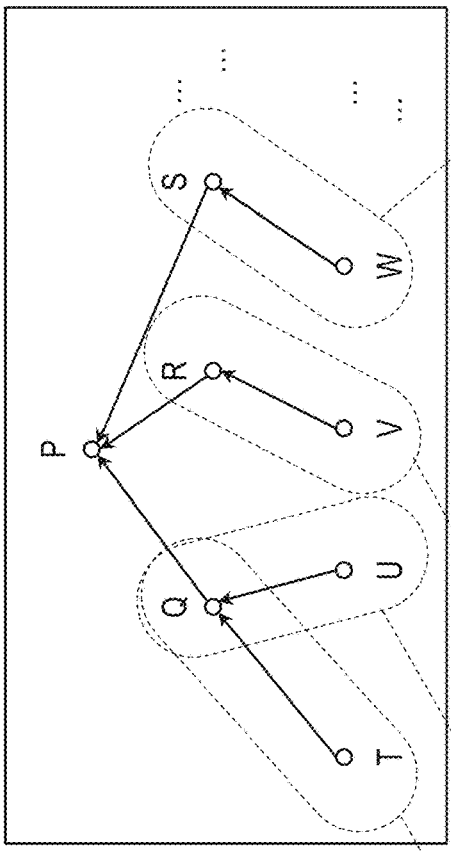
FIG. 5 shows an example of update of a generalization hierarchy in a primary storage device based on an LRU algorithm.

For Algorithm 3, in a case where attribute values (T, T, U, U, V, W) are stored in the vector $\hat{c}$ in the primary storage device 10A and (Q←T, Q←U, R←V), which are portions of the generalization hierarchy, are stored in the vector $\hat{d}$ in the primary storage device 10A as shown in the example of FIG. 5, for example, then R←V, which has been least frequently referenced, is replaced with (S←W) as a new portion of the generalization hierarchy by the LRU algorithm based on the frequency of references to these portions of the generalization hierarchy. Since the generalization hierarchy stored in the vector $\hat{d}$ in the primary storage device 10A is already used at the time of replacement and will not be used again, it may be safely replaced by some other algorithm than the LRU algorithm.

<Effects>

In generalization of data, it is common to move the data from the secondary storage device to the primary storage device, perform calculations at the primary storage device, and then move the data from the primary storage device back to the secondary storage device; however, it is important to make as less accesses to the secondary storage device as possible because the secondary storage device is slow in operation due to its nature compared to the primary storage device. Additionally, when accesses are made to the secondary storage device, it is important for speedup to realize sequential access, rather than random access, so as not to lower the efficiency of processing.

According to the data generalization apparatus 1 in this embodiment, by making an arrangement such as previous sorting of data and selecting the way of taking data for attribute values and the generalization hierarchy from the secondary storage device 10B in a form suited for generalization processing, it is possible to reduce the number of accesses to the secondary storage device 10B and allow for efficient sequential accesses when making accesses to the secondary storage device 10B, so that generalization processing can be performed on large-scale data at high speed using only the primary storage device 10A of a small capacity.

<Appendix>

The apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiment, but modifications may be made within the scope of the present invention. Also, the processes described in the embodiment may be executed not only in a chronological sequence in accordance with the order of their description but may be executed in parallel or separately according to the processing capability of the apparatus executing the processing or any necessity.

As already mentioned, when the processing functions of the hardware entities described in the embodiment (the apparatus of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

What is claimed is:

1. A data generalization apparatus for generalizing attribute values, the data generalization apparatus comprising:
   rearrangement circuitry that rearranges the attribute values in a secondary memory in accordance with an order of arrangement of the attribute values in a generalization hierarchy in the secondary memory;
   attribute value retrieval circuitry that retrieves some of the rearranged attribute values from the secondary memory into a primary memory;
   generalization hierarchy retrieval circuitry that retrieves a portion of the generalization hierarchy from the secondary memory into the primary memory, the portion corresponding to the attribute values to be processed among the attribute values retrieved into the primary memory;
   generalization processing circuitry that executes generalization processing based on the attribute values retrieved into the primary memory and the generalization hierarchy retrieved into the primary memory; and
   re-rearrangement circuitry that moves the attribute values after the generalization processing to the secondary memory and rearranges them into an original order.

2. The data generalization apparatus according to claim 1, wherein the generalization hierarchy retrieval circuitry updates the generalization hierarchy in the primary memory based on an LAU (least recently used) algorithm.

3. A data generalization method for generalizing attribute values; the data generalization method comprising:
- rearranging the attribute values in a secondary memory in accordance with an order of arrangement of the attribute values in a generalization hierarchy in the secondary memory;
- retrieving some of the rearranged attribute values from the secondary memory into a primary memory;
- retrieving a portion of the generalization hierarchy from the secondary memory into the primary memory, the portion corresponding to the attribute values to be processed among the attribute values retrieved into the primary memory;
- executing generalization processing based on the attribute values retrieved into the primary memory and the generalization hierarchy retrieved into the primary memory; and
- moving the attribute values after the generalization processing to the secondary memory and rearranging them into an original order.

4. A non-transitory computer-readable storage medium storing a program for causing a computer to perform the method of claim 3.

5. The method of claim 3, wherein the retrieving the portion of the generalization hierarchy updates the generalization hierarchy in the primary memory based on an LRU (least recently used) algorithm.

6. A non-transitory computer-readable storage medium storing a program for causing a computer to perform the method of claim 5.

* * * * *

UNITED STATES PATENT AND TRADEMARK OFFICE
CERTIFICATE OF CORRECTION

PATENT NO. : 11,914,740 B2
APPLICATION NO. : 17/434761
DATED : February 27, 2024
INVENTOR(S) : Satoshi Hasegawa It is certified that error appears in the above-identified patent and that said Letters Patent is hereby corrected as shown below:

In the Claims

Column 8, Line 67, should be changed "based on an LAU (least recently used) algorithm" to -- based on an LRU (least recently used) algorithm --.

Signed and Sealed this
Fourteenth Day of May, 2024

Katherine Kelly Vidal
*Director of the United States Patent and Trademark Office*